Figure 1:
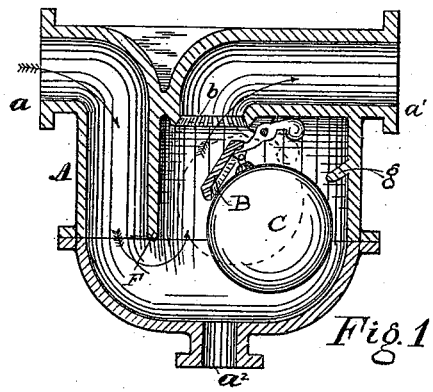

(No Model.) 2 Sheets—Sheet 1.

A. J. WRIGHT.
SAFETY STEAM SEPARATOR.

No. 492,083. Patented Feb. 21, 1893.

WITNESSES
Loren R. Vorce
[signature]

INVENTOR
Allen J. Wright
by [signature]
ATTORNEY (No Model.) 2 Sheets—Sheet 2.
A. J. WRIGHT.
SAFETY STEAM SEPARATOR.
No. 492,083. Patented Feb. 21, 1893.
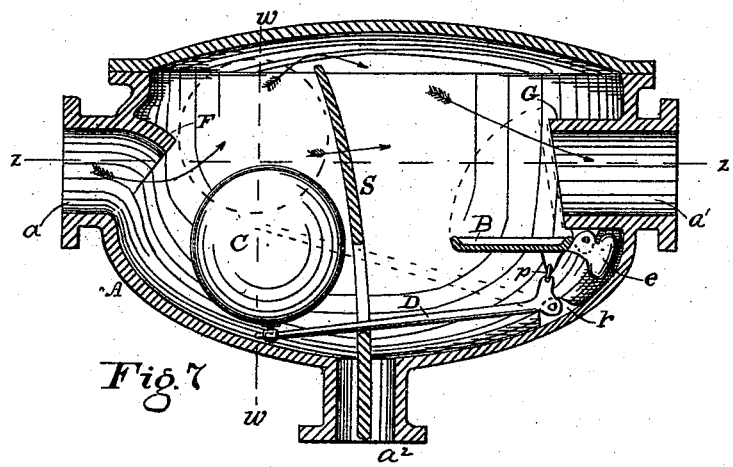
Fig. 7
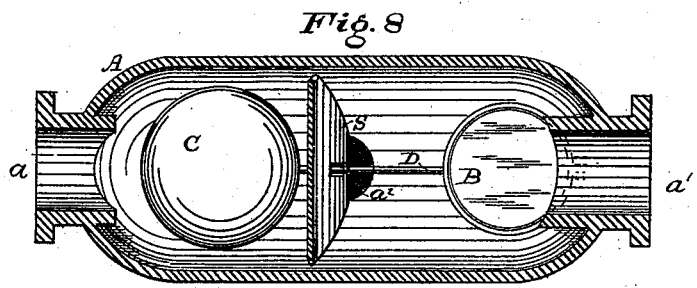
Fig. 8
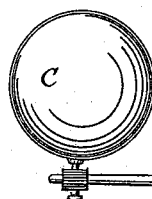
Fig. 10  Fig. 9  Fig. 11
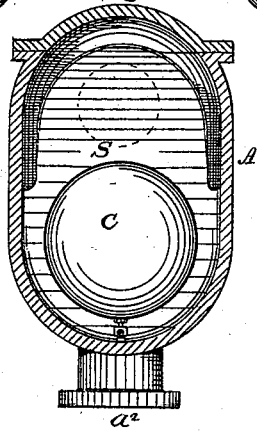
WITNESSES
Loren R. Vorce
Sam Printiss
INVENTOR
Allen J. Wright
by
ATTORNEY

UNITED STATES PATENT OFFICE.

ALLEN J. WRIGHT, OF CLEVELAND, OHIO.

SAFETY STEAM-SEPARATOR.

SPECIFICATION forming part of Letters Patent No. 492,083, dated February 21, 1893.

Application filed April 18, 1892. Serial No. 429,566. (No model.)

*To all whom it may concern:*

Be it known that I, ALLEN J. WRIGHT, a citizen of the United States, residing at Cleveland, in the county of Cuyahoga and State of Ohio, have invented certain new and useful Improvements in Safety Steam-Separators; and I do hereby declare the following to be a full, clear, and exact description of the invention, such as will enable others skilled in the art to which it appertains to make and use the same.

My invention relates to devices for intercepting and collecting the water present in steam and steam pipes whether mechanically carried by the steam or condensed therefrom.

The object is to provide efficient means for intercepting such water where the quantity is or may become considerable, and the invention consists of certain features of arrangement and construction hereinafter fully described and pointed out in the claims.

In the drawings several modifications of structure and arrangement of parts necessary to adapt the apparatus for use under varying conditions are shown, all operating, however, in the same general manner.

Figure 5:
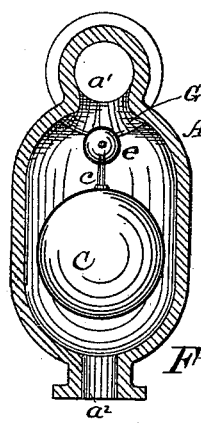
Figure 6:
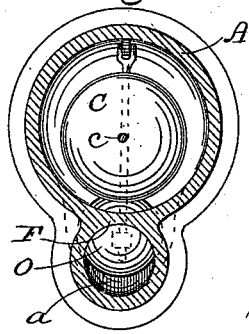

Figures 1, 2, 3, 4 and 7 represent central longitudinal sections in a vertical plane. Fig. 5 is a vertical transverse section of the apparatus shown in Fig. 3, taken on the line $x—x$ of Fig. 3. Fig. 6 is a horizontal section, on the line $y—y$, of the apparatus shown in Fig. 4. Fig. 8 is a horizontal section, on the line $z—z$, of the apparatus shown in Fig. 7. Fig. 9 is a vertical transverse section, on line $w—w$ of Fig. 7. Figs. 10 and 11 are detail views in elevation of modifications of the manner of connecting the valve, lever and float thereof.

The float in all cases is for convenience shown in elevation.

In all of the several figures, A represents the separator chamber, $a$ the steam inlet thereto, and $a'$ the steam outlet therefrom; these are preferably, though not necessarily in line with each other, so as to permit of inserting the apparatus in any straight line of steam-pipe, but their relative position may be changed as the location in which the separator is to be placed may require. Thus the steam inlet may be directly downward instead of from the side, to enable the apparatus to be set at an angle in the supply pipe.

B represents a valve adapted to close the steam inlet or outlet, or both.

B' is the second wing of the valve when arranged to act as a fly valve.

Figure 2:
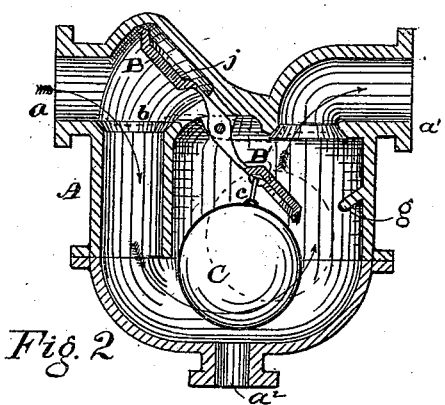
Figure 3:
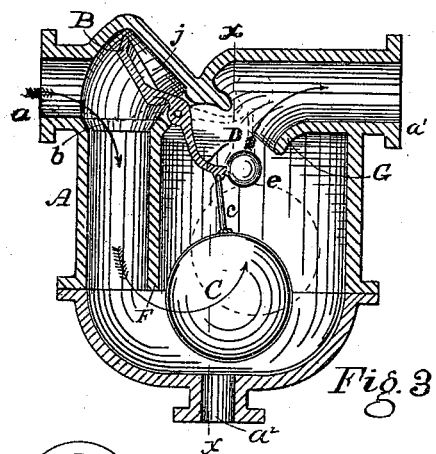

C is a float, by means of which the valve is closed as the water rises in chamber A, and may be connected to the valve directly, as in Fig. 1, or by means of a rod of stem $c$, as in Figs. 2, 3 &c.

D is a lever to which in some cases the float is attached, and $e$ is a counterpoise which substantially balances the valve to, render the action of the valve more sensitive and certain.

$b$ represents the valve seat, $a^2$ the water outlet, $h$ lug to which the valve or valve lever is pivoted, $i$ a valve stem, $j$ recess for valve when open, $k$ lug to which lever $l$, of water-escape valve $m$, is pivoted, and O a float actuating the water escape valve.

From the point where it joins the chamber A the steam inlet is continued downward in most cases, its extremity forming substantially a baffle-plate, under which the steam passes to the main part of chamber A. F represents this inward extension of the steam inlet, and G represents a similar though shorter inward extension at the steam outlet.

$g$ $g'$ &c represent baffle-plates projecting from the wall of the separator chamber, which are employed in some cases, but are usually unnecessary.

Figure 1 represents the simplest form of the apparatus. The valve is counterweighted so as to be nearly balanced, but so that the weight of the float when unsupported will keep it open, yet require very little lifting force to shut it. The water brought in by the steam is thrown toward the bottom of the chamber while the steam turns abruptly upward to the exit, passing chiefly between the float and the inner side of the partition F. A baffle plate, $g$, may with advantage be located on the exit side of the chamber A to prevent the water from being blown upward on that side by the current of escaping steam. In case the water coming into chamber A accumulates faster than the outlet $a^2$ will carry it away, it lifts the float C and closes the valve B before any water can rise to the steam exit. This form of separator will deal with any reasonable amount of water and prevent the escape of any part of it into the steam supply pipe.

In Fig. 2 is shown the separator arranged with a fly valve, closing at once both the inlet and outlet of the steam, which is desirable in case of a sudden rush of water instead of a gradual though rapid accumulation. The valve B', closing the exit, moves in the same direction as the rush of water, and makes the device very quick acting. The valves B and B' balance each other so that the weight of the float keeps the valve open so long as steam only is passing.

In Fig. 3 is shown the construction adopted where the quantity of water coming in is large but steady, as in case of excessive condensation &c. The valve is provided with a lever extending back from the pivotal point, preferably counterweighted, and having the float attached by its rod to the lever, giving the float increased power, and as the chamber is deep the valve closes gradually, allowing the outlet $a^2$ to relieve the chamber A as the steam current slackens, without entirely closing the valve in ordinary circumstances.

Figure 4:
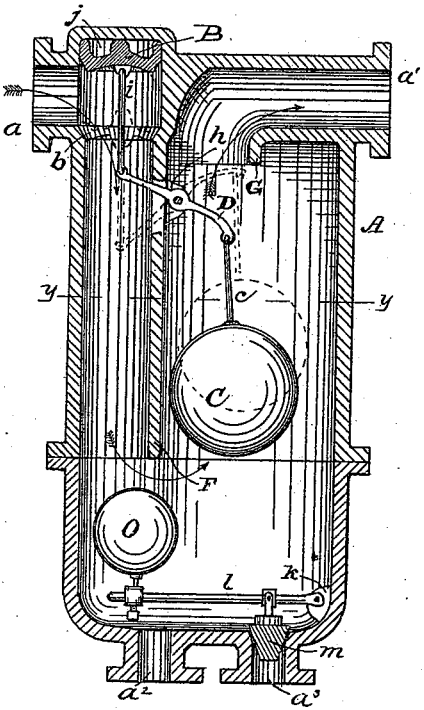

In Fig. 4 is shown a construction adopted in situations where the quantity of water is ordinarily large and sudden rushes of water are also to be apprehended. The weight of the float C and lever D keeps the valve normally open, while it closes easily and quickly when the water rises, and instantly in case of a sudden rush of water, which will itself catch the closing valve and force it shut, even before the float would fully close it. A second water outlet $a^3$ may also be provided, closed normally by the valve $m$ and having a float O secured to the valve lever $l$, which will, in case of such a sudden rush of water, open the outlet $a^3$ and in connection with the outlet $a^2$ speedily lower the water and allow the float C to open the valve again. The valve $m$ is usually adjusted to close before valve B opens, the outlet $a^3$ being intended only to supplement the outlet $a^2$ in case of such sudden inrush or increase of water.

It sometimes occurs, as where an engine is set on a lower level than the boiler from which it receives steam, that water will siphon over from the boiler. Improper arrangement of the steampipes &c will also sometimes occasion such siphoning in other cases. In such situations I employ the construction shown in Fig. 7, in which the chamber A is given increased capacity, preferably in a horizontal direction. The valve B is arranged to close the steam exit; the lever D is pivoted to a lug $r$ on the chamber wall and is connected by the rod $p$ to the valve B so as to close the valve quickly as the float rises. A baffle plate S is interposed about midway of the chamber A and extends from near the top of the chamber to the bottom thereof, and preferably into the water outlet as shown: this plate may be slotted to allow the valve lever D to pass through it. The plate S ordinarily acts as a baffle plate merely, to collect the water thrown upon it by the steam passing over and around it. The water in case it accumulates faster than outlet $a^2$ can educt it lifts the float and closes the valve, opening very quickly as the water falls, but in case of siphoning over of water, the plate S deflects the inrushing water downward, causing it to quickly raise the float and to close the valve before the water rises enough to pass around the baffle plate, which extends to the sides of the chamber at its lower portion.

In all the figures the valve B is shown in its open position by full lines and in its closed position by dotted lines, and is arranged in all cases to open with, and not against, the steam current, for greater certainty. In the construction shown in Figs. 7 and 8, the valve may be arranged to close downward, by pivoting it above the outlet pipe and placing lever D, properly adjusted, above it, the float being suspended from D and by its weight keeping valve B up; in this case the weight of valve B will assist in closing it.

The form of the chamber A is not arbitrary, and it may be constructed and connected otherwise than as shown in the drawings without departing from my invention, so long as the same mode of operation is preserved. I have shown in the drawings such forms as I have found most convenient in general use. The float is preferably of considerably larger diameter than the steam inlet to insure sufficient lifting capacity for quick action of the valve. For a four inch steam inlet a float ten or twelve inches in diameter, or one of equivalent lifting power may be used, and in proportion for smaller sizes of steam inlet. The number, size and form of the baffle plates may be varied to suit the particular circumstances in each case.

What I claim as my invention, and desire to secure by Letters Patent, is—

1. A safety steam-separator consisting essentially of a separator-chamber having a water-space and water-outlet at its lower part and a steam-inlet and steam-outlet above the same, a partition or separating plate in said chamber to deflect the current of steam a valve or valves pivoted in said chamber and adapted to close the steam-passage, and a pendulous float connected substantially as shown to said valve and adapted to close the same by the rising of the water in said chamber, substantially as described.

2. In a safety steam separator the combination of a separating chamber having a water space and water outlet at its lower part and a steam inlet and steam outlet above the same, a valve pivoted in said chamber and adapted to close the steam inlet, and a float connected directly to said valve and adapted to operate the same by the rising of water in said chamber, substantially as described.

3. In a safety steam separator the combination of a separating chamber having a water space and water outlet at its lower part and a steam inlet and steam outlet above the same, a valve pivoted in said chamber and adapted to close the steam outlet, and a direct acting swinging float connected directly to said valve and adapted to close the same by the rising of water in said chamber, substantially as described.

4. In a safety steam separator the combination of a separating chamber having a water space and water outlet at its lower part and a steam inlet and steam outlet above the same, valves carried on the opposite ends of the same pivoted arm and adapted one to close the steam inlet and the other the steam outlet, and a float connected to said arm or valve and adapted to simultaneously close both valves by the rising of water in said chamber, substantially as described.

5. In a safety steam separator the combination of the separating chamber having a water space and water outlet at its lower part and a steam inlet and steam outlet above the same, a valve adapted to close the steam passage, a lever connected directly to said valve, and a swinging float connected to the lever and adapted to close the valve by means thereof when lifted by the water rising in said chamber, substantially as described.

6. The combination in a steam separator of the separating chamber having a valve adapted to close its steam passage, and a direct acting swinging float connected directly to said valve and adapted to close the same as the water rises in said chamber, substantially as set forth.

In testimony whereof I hereto affix my signature in presence of two witnesses.

ALLEN J. WRIGHT.

Witnesses:
LOREN PRENTISS,
WM. G. TAYLOR.